_US005350792A_

United States Patent [19]

Hess et al.

[11] Patent Number: 5,350,792
[45] Date of Patent: Sep. 27, 1994

[54] PIGMENT-CONTAINING PLASTIC MOLDING COMPOSITION

[75] Inventors: Gerhard Hess, Hofheim am Taunus; Ulrich Haack, Alsbach; Klaus Kurz, Hofheim am Taunus, all of Fed. Rep. of Germany

[73] Assignee: Hoechst Aktiengesellschaft, Fed. Rep. of Germany

[21] Appl. No.: 906,266

[22] Filed: Jun. 26, 1992

[30] Foreign Application Priority Data

Jun. 29, 1991 [DE] Fed. Rep. of Germany ....... 4121676

[51] Int. Cl.$^5$ ................................................. C09C 1/36
[52] U.S. Cl. .................................... 524/417; 106/436; 106/472; 106/499; 524/424
[58] Field of Search ................. 106/499, 436, 472; 524/417, 424

[56] References Cited

U.S. PATENT DOCUMENTS

| 3,503,923 | 3/1970 | Petrella et al. | 524/407 |
| 4,477,608 | 10/1984 | Babler et al. | 523/215 |
| 4,959,406 | 9/1990 | Foltin et al. | 524/413 |

FOREIGN PATENT DOCUMENTS

| 1284125 | 5/1991 | Canada . |
| 0247765 | 12/1987 | European Pat. Off. . |
| 0327384 | 8/1989 | European Pat. Off. . |
| 0456471 | 11/1991 | European Pat. Off. . |

Primary Examiner—Mark L. Bell
Assistant Examiner—Scott Hertzog
Attorney, Agent, or Firm—Connolly & Hutz

[57] ABSTRACT

A plastic molding composition based on an organic thermoplastic polymer containing a black mineral pigment suitable as a material for the preparation of shaped articles which can be provided with symbols by exposure to laser radiation. The black pigment used is in particular animal charcoal, and the thermoplastic polymer is in particular a polyoxymethylene.

12 Claims, No Drawings

PIGMENT-CONTAINING PLASTIC MOLDING COMPOSITION

DESCRIPTION

Pigment-containing plastic molding composition The invention relates to a plastic molding composition which essentially comprises at least one organic polymer and at least one carbon-containing pigment, and to the use of a plastic molding composition of this type as the starting material for the production of shaped articles which can be provided with symbols with the aid of laser radiation.

It is known that plastic parts can be provided with symbols if the plastic contains a filler which discolors when exposed to energy radiation and the surface of the parts is subjected to energy radiation; the energy radiation used here is a deflectable, focusable energy beam, preferably a laser beam (German Patent 2 936 926=EP-A 27 532). The plastic material used is, in particular, polyacetal, and the filler employed is carbon black or graphite, preferably in a concentration of 0.08 to 0.125 percent; an optical brightener which is not destroyed by the action of the laser beam may also be admixed with the pigment (German Patent 3 044 722=European Patent 53 256).

Furthermore, a process has been disclosed for inscribing high-molecular-weight material which contains at least one radiation-sensitive, discoloration-causing additive, where the energy radiation used is laser light whose wavelength is in the near UV and/or visible ant/or near IR region, and the additive used is at least one inorganic and/or organic pigment and/or a polymer-soluble dye. The high-molecular-weight material is, in particular, a fully synthetic organic polyplastic, i.e., a plastic prepared by polymerization, polycondensation or polyaddition, inter alia a polyolefin, polyester, polyamide, polyether and polyacetal, or alternatively a mixture of such polymers. Examples of inorganic pigments are white pigments, metal oxides, metal sulfides, carbon black and graphite, the metal-containing pigments being preferred. The amount of additive is from 0.001 to 10 percent by weight (based on the high-molecular-weight material). The radiation source used is a pulsed laser, for example a solid-state pulsed laser, a pulse-modified continuous wave laser, a metal vapor laser or a semiconductor laser (EP-A 190 997).

Also known is a process for the laser inscription high-molecular-weight organic material in the form of articles, sheets and films in which the material, which contains at least one radiation-sensitive, bleachable additive and at least one less radiation-sensitive, unbleachable compound, is exposed to a laser beam; pulsed laser light whose wavelength is in the near UV and/or visible range is used, and the bleachable additive is at least one azo and/or indanthrone pigment, and the unbleachable compound is at least one inorganic and/or organic pigment and/or a polymer-soluble dye. The pulsed laser light is generated here, in particular, using a pulsed or pulse-modified, frequency-doubled Nd:YAG laser or a metal vapor laser or an excimer laser (EP-A 327 508).

It is an object of the present invention to provide a pigment-containing plastic molding composition which has been colored black and can be thermoplastically shaped to give articles which can be provided with symbols by the action of laser radiation.

The invention relates to a plastic molding composition which essentially comprises at least one organic polymer and at least one carbon-containing pigment; in the molding composition, (a) the polymer is a thermoplastic polymer which is at least partially transparent to light in the wavelength range from 180 to 1200 nm, (b) the pigment is a black mineral pigment and (c) the molding composition may contain at least one further additive.

The invention furthermore relates to the use of the above-described plastic molding composition as a material for the production of shaped articles which can be provided with symbols with the aid of laser radiation.

The invention furthermore relates to a process for the production of a molding provided with symbols, by exposing an article produced from a plastic molding composition which essentially comprises at least one organic polymer and at least one carbon-containing pigment to the action of laser radiation; in this process, a plastic molding composition is used which comprises (a) a thermoplastic polymer which is at least partially transparent to light in the wavelength range from 180 to 1200 nm, (b) a pigment which is a black mineral pigment and (c) if desired at least one further additive, and the molding is exposed to laser radiation having a principal wavelength of 1064 nm or 532 nm or 351,308 and 248 nm.

The polymer (a) used according to the invention is a thermoplastic polymer which is at least partially transparent to light in the wavelength range from 180 to 1200 nm preferably from 240 to 1100 nm. Examples of such polymers are polyesters, for example polyethylene terephthalate and polybutylene terephthalate, polyarylates, polyarylene sulfides, such as polyphenylene sulfide, and polyaryl ether ketones, furthermore, in particular, polyolefins, if desired containing fluorine atoms, for example polyethylene, polypropylene and polytetrafluoroethylene, and polymers containing amide or acetal groups in the main chain; particular preference is given to polyacetals, i.e. oxymethylene homopolymers and oxymethylene copolymers containing oxyethylene units. Instead an individual polymer, it is also possible to use mixture of different polymers.

The pigment (b) is the essential feature of the plastic molding composition according to the invention. It is a black mineral pigment known as animal charcoal, bone black or ivory black. It contains from 70 to 90 percent by weight of calcium phosphate and from 10 to 30 percent by weight of carbon, preferably from 75 to 85 percent by weight of calcium phosphate and from 15 to 25 percent by weight of carbon. The proportion of the black pigment in the plastic molding composition is from 0.001 to 10 percent by weight, preferably from 0.01 to 8 percent by weight; a proportion of from 0.2 to 5 percent by weight is particularly advantageous.

The density of the black pigment is in the range from 2.3 to 2.8 $g.cm^{-3}$ preferably from 2.4 to 2.6 $g.cm^{-3}$. A black pigment having a particle diameter of from 1 to 50 $\mu m$, preferably from 2 to 25 $\mu m$, is particularly suitable.

The plastic molding composition according to the invention may also contain at least one further additive (c). This additive is generally an inorganic pigment containing no free carbon; titanium dioxide is particularly suitable. The additive is in the plastic molding composition in an amount of from 0.01 to 2 percent by weight, preferably from 0.01 to 1 percent by weight, based on the sum of components (a) and (b).

Depending on the application, further substances may therefore be added to the molding composition, for example fillers, such as chalk, mica, talc, feldspars, wollastonite, aluminum silicate, furthermore antioxidants, light stabilizers, flameproofing agents, heat stabilizers, reinforcing agents, such as glass fibers, or processing assistants which are usual in the processing of plastics.

The molding composition according to the invention can be prepared by conventional processes. Thus, for example, the black pigment components (b) and, if used, components (c) are admixed with the plastic material using an extruder, mixer or grinder. The mixture obtained is then converted to the desired final shape by processes known per se, such as pressing, casting, calendaring, extrusion or injection molding.

The laser inscription is carried out by introducing the samples into the ray path of the pulsed laser, for example Nd:YAG laser or a frequency-doubled Nd:YAG laser. Inscription using an excimer laser, for example by a mask technique, is also possible. However, the desired results can also be achieved using lasers of other conventional types. The plastic molding composition according to the invention can be used in areas where printing techniques have hitherto been employed for inscription. Thus, the process has to date been used for inscribing or labeling moldings made of thermoplastic material in the electronics and automotive industries, for example for labeling keyboards, housings and individual parts. These shaped articles can then easily be provided with symbols with the aid of laser radiation.

EXAMPLES

EXAMPLE 1

A homogeneous mixture of 99 parts by weight of a commercially available polyacetal (copolymer comprising 98 percent by weight of oxymethylene units and 2 percent by weight of oxyethylene units and having a melt flow index (MFI 190/2.16) of 9 g/10 min (DIN 53735) and a crystallite melting range of from 164° to 167° C.) and 1 part by weight of commercially available black mineral pigment (C.I. Pigment Black 9) was prepared in a commercially available extruder (ZSK 28, Werner und Pfleiderer, Stuttgart, Germany). The black pigment (animal charcoal) comprised 83 percent by weight of calcium phosphate and 17 percent by weight of carbon; its density was 2.5 $g.cm^{-3}$ and its bulk density was 350 $kg.m^{-3}$ and the particle diameter was in the range from 2 to 20 $\mu m$.

The resultant molding composition was used to injection mold sheet-like test specimens (120 mm×80 mm×2 mm). The test specimens were exposed to the radiation of a Nd:YAG laser;

a) the pulse frequency was 15 kHz at a laser power of about 20 watts.

b) the inscription field of the YAG laser had a diameter of 150 mm and a free working distance of 180 mm.

During the irradiation, the laser beam was moved in such a manner that characters were produced on the test, specimens. The contrast ratio was 28.0.

The contrast ratio represents the quotient of the intensity of the reflected light from the plastic sheet when illuminated with white light (KL 1 SOB swan-neck lamp, Schott, Mainz, Germany) and that of the reflected light from a symbol supplemented by the laser (square of the area 20.20 $mm^2$); the value was obtained with the aid of a photocell (BPW 27).

EXAMPLES 2 TO 4

Example 1 was repeated using different amounts of the black pigment. The contrast ratio was determined for each of the inscribed test specimens. Table 1 shows the details.

TABLE 1

| Example | Amount of black pigment | Contrast ratio |
|---|---|---|
| 2 | 0.2% by weight | 13.2 |
| 3 | 0.4% by weight | 36.0 |
| 4 | 5.0% by weight | 17.5 |

Example 5

Example 1 was repeated, but 0.1 parts by weight of titanium dioxide was additionally mixed with the molding composition. The contrast ratio was 22.3.

Comparative examples

Example 1 was repeated using various conventional types of carbon black in place of the animal charcoal. The contrast ratio was determined for each of the inscribed test specimens. Table 2 shows the details.

TABLE 2

| Experiment | Type and amount of carbon black | Additive/amount | Contrast ratio |
|---|---|---|---|
| a | ® Acetogen carbon black* | — | 13.5 |
| b | ® Printex 90**/1% by wt. | — | 5.0 |
| c | ® Acetogen carbon black/1% by wt. | $TiO_2$/0.1% by wt. | 15.5 |

*AV (manufacturer Hoechst AG, Frankfurt am Main, Germany)
**(manufacturer Degussa AG, Frankfurt am Main, Germany)

We claim:

1. A plastic molding composition essentially comprising at least one organic polymer and at least one carbon-containing pigment, wherein (a) the polymer is a thermoplastic polymer which is at least partially transparent to light in the wavelength range from 180 to 1200 nm, (b) the pigment is animal charcoal, bone black or ivory black.

2. A plastic molding composition as claimed in claim 1, wherein the thermoplastic polymer (a) is a polyolefin, which may contain fluorine atoms, or a polymer containing amide or acetal groups in the main chain.

3. A plastic molding composition as claimed in claim 1, wherein the thermoplastic polymer (a) is a polyoxymethylene.

4. A plastic molding composition as claimed in claim 3, wherein the thermoplastic polymer (a) is an oxymethylene copolymer.

5. A plastic molding composition as claimed in claim 1, wherein the amount of the pigment (b) is from 0.001 to 10 percent by weight (based on the plastic molding composition).

6. A plastic molding composition as claimed in claim 1, wherein the pigment ( b ) contains from 70 to 90 percent by weight of calcium phosphate and from 30 to 10 percent by weight of carbon.

7. A plastic molding composition as claimed in claim 1, wherein the particle diameter of the pigment (b) is in the range from 1 to 50 $\mu m$.

8. A plastic molding composition as claimed in claim 1, including (c) an inorganic pigment containing no free carbon and wherein the pigment (b) is mixed with component (c).

9. A plastic molding composition as claimed in claim 8, wherein component (c) is titanium dioxide.

10. A shaped article provided with symbols with the aid of laser radiation and produced from a plastic molding composition as claimed in claim 1.

11. A process for the production of a molding provided with symbols from a plastic molding composition through the action of laser radiation, where the molding composition essentially comprises at least one organic polymer and at least one carbon-containing pigment, wherein a plastic molding composition is used which comprises (a) a thermoplastic polymer which is at least partially transparent to light in the wavelength range from 180 to 1200 nm, and (b) a pigment which is animal charcoal, bone black or ivory black and the molding is exposed to laser radiation having a principal wavelength of 1064 nm or 532 nm or 351, 308 and 248 nm.

12. A process as claimed in claim 11, wherein the plastic molding composition includes (c) an inorganic pigment containing no free carbon.

* * * * *